United States Patent [19]

Tsuji

[11] 4,247,171
[45] Jan. 27, 1981

[54] COMPACT PHOTOGRAPHIC LENS WITH LARGE APERTURE

[75] Inventor: Sadahiko Tsuji, Yokohama, Japan
[73] Assignee: Canon Kabushiki Kaisha, Tokyo, Japan
[21] Appl. No.: 891,024
[22] Filed: Mar. 28, 1978
[30] Foreign Application Priority Data
  Mar. 31, 1977 [JP] Japan .................. 52-37312
[51] Int. Cl.³ ............................... G02B 9/62
[52] U.S. Cl. .................................... 350/464
[58] Field of Search ............. 350/215, 176
[56] References Cited
  U.S. PATENT DOCUMENTS

| | | | |
|---|---|---|---|
| 3,743,387 | 7/1973 | Nakagawa | 350/215 |
| 3,851,953 | 12/1974 | Nakagawa | 350/215 |
| 3,984,155 | 10/1976 | Nakagawa | 350/215 |
| 4,099,843 | 7/1978 | Imai | 350/215 X |
| 4,110,007 | 8/1978 | Ikeda | 350/215 |

Primary Examiner—Paul A. Sacher
Attorney, Agent, or Firm—Toren, McGeady and Stanger

[57] ABSTRACT

The present invention relates to a Gauss type lens, comprising a first positive meniscus lens whose convex surface is directed to the object, a second positive meniscus lens whose convex surface is directed to the object, a third negative meniscus lens whose convex surface is directed to the object, a fourth negative meniscus lens whose concave surface is directed to the object, consisting of a negative and a positive lens cemented on each other, the fifth positive meniscus lens whose concave surface is directed to the object and the sixth positive lens and satisfying the following conditions.

(1) $0.29f < r_6 < 0.33f$
(2) $0.30f < |r_7| < 0.35f$
(3) $0.65f < r_4 < 0.8f$
(4) $1.3 < (r_5/r_4) < 1.8$
(5) $0.14f < d_3 + d_4 + d_5 < 0.18f$
(6) $0.13f < d_7 + d_8 < 0.17f$ whereby f is the focal length of the photographic lens, ri the radius of curvature of the i-th lens surface and di the i-th lens surface distance.

8 Claims, 19 Drawing Figures

-.005 0 .005
Spherical aberration

-.005 0 .005
Astigmatism

-1% 0 1%
Distortion

-.005 0 .005
Spherical aberration

-.005 0 .005
Astigmatism

-1% 0 1%
Distortion

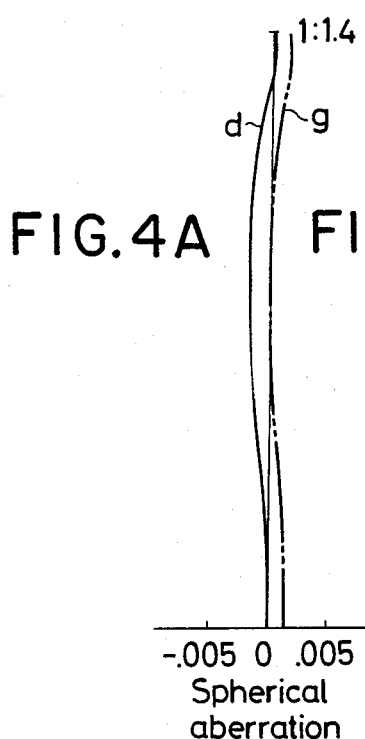
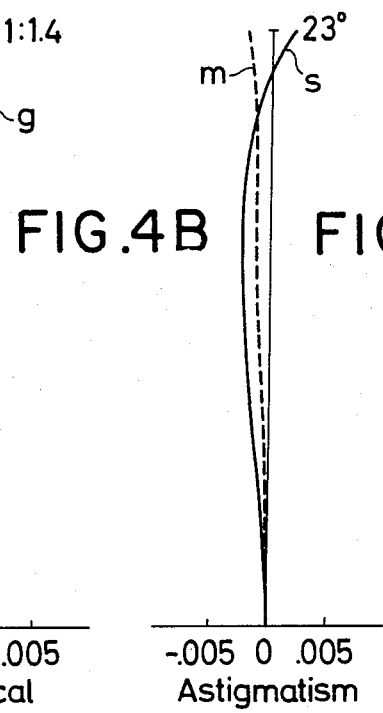
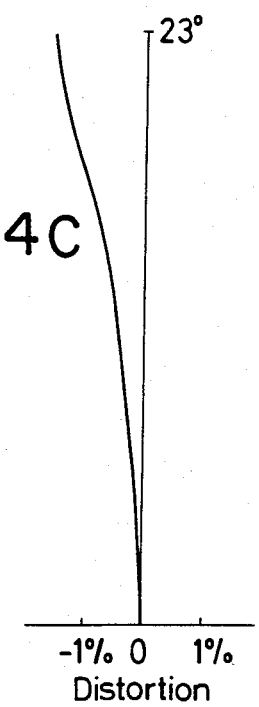
FIG.4A  FIG.4B  FIG.4C
-.005 0 .005
Spherical
aberration
-.005 0 .005
Astigmatism
-1‰ 0 1‰
Distortion
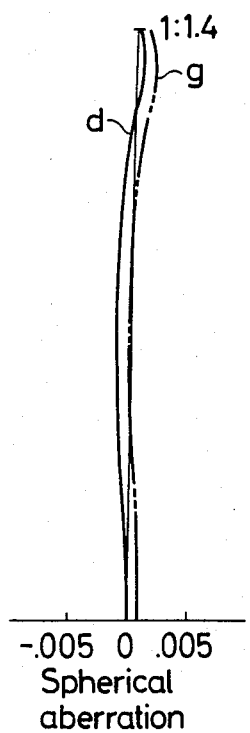
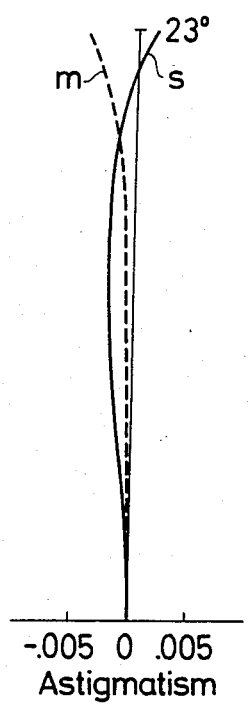
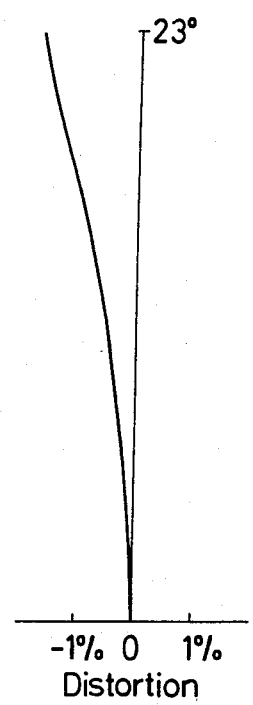
FIG.5A  FIG.5B  FIG.5C
-.005 0 .005
Spherical
aberration
-.005 0 .005
Astigmatism
-1‰ 0 1‰
Distortion -.005 0 .005
Spherical
aberration -.005 0 .005
Astigmatism -1% 0 1%
Distortion -.005 0 .005
Spherical
aberration -.005 0 .005
Astigmatism -1% 0 1%
Distortion

COMPACT PHOTOGRAPHIC LENS WITH LARGE APERTURE

BACKGROUND OF THE INVENTION

The present invention relates to a photographic lens, particularly of the Gauss type.

Further, the present invention relates to a photographic lens presenting a long back focal distance suitable for a single lens reflex camera. The photographic lenses of the Gauss type are widely used, whereby the British Pat. No. 1,120,335 discloses such a photographic lens whose cemented doublet lens immediately before the diaphragm is put apart so as to provide an air gap between the positive meniscus lens and the negative meniscus lens. The British Patent was published on July 17, 1968.

Ever since, the photographic lens of the Gauss type whose doublet lens is put apart has been improved and modified in various ways, whereby the recent ones are disclosed for example, with the U.S. Pat. Nos. 3,938,884 and 3,984,155.

In the case of the photographic lens with the long back focal distance on the one hand, it is necessary to prepare the refractive power of the lens provided behind the diaphragm disposed in the air gap between the two negative doublet lenses remarkably larger than that of the lens provided in front of the diaphragm. In consequence, in order to realize a compact lens, keeping the back focal distance, it is necessary to increase the radius of curvature or the number of the lenses in order to support the strong refractive power of the lens part behind the diaphragm, whereby it becomes difficult to obtain a compact lens system whose total length is decreased. Further, the refractive power before the diaphragm is different from that behind the diaphragm and therefore the symmetricity with reference to the diaphragm as center is remarkably destroyed in such a manner that it is considerably difficult to obtain a proper aberration compensation of a lens with a large aperture.

Hereby, in order to obtain a compact lens and a proper aberration compensation, the refractive power of the lens part before the diaphragm has to be also increased, whereby on the other hand, the radius of curvature of each lens is enlarged in such a manner that it becomes also the more difficult to compensate various aberrations satisfactorily.

SUMMARY OF THE INVENTION

The purpose of the present invention is to offer a compact photographic lens with a large aperture and well compensated aberrations.

For the sake of an easy and correct understanding of the present invention, explanation will be made in accordance with FIG. 1.

The first group (1) is a meniscus lens with a positive refractive power, whose convex surface is directed to the object. The second group (2) is a positive meniscus lens with a slight air gap between the first group and itself, whose convex surface is directed to the object. The third group (3) is a negative meniscus lens with a slight air gap between the second group and itself, whose convex surface is directed to the object. The fourth group (4) is a negative meniscus lens having a large air gap including a diaphragm between the third group and itself and consisting of a negative and a positive lens cemented on each other, whereby the convex surface is directed to the film plane. The fifth group (5) is a positive meniscus having a slight air gap between the fourth group and itself, whereby the convex surface is directed to the image plane. The sixth group (6) is a lens having convex surfaces on both side and a slight air gap between the fifth group and itself. Hereby, let r4 be the radius of curvature of the rear surface of the second group, r5 the radius of curvature of the front surface of the third group, r6 the radius of curvature of the rear surface of the third group, r7 the radius of curvature of the first surface of the fourth group, d3 the thickness of the second group along the optical axis, d4 the distance between the second and the third group along the optical axis, d5 the thickness of the third group along the optical axis, d7 the thickness of the negative fourth group lens along the optical axis, d8 the thickness of the positive fourth group lens along the optical axis, n3 the refractive index of the glass material of the third group, n5 the refractive index of the glass material of the positive fourth group lens, n6 the refractive index of the glass material of the positive fifth group lens, n7 the refractive index of the glass material of the sixth group and f the focal distance of the total optical system. Then, more than one of the following conditions are satisfied.

(1) 0.29f<r6<0.33f
(2) 0.3f<|r7|<0.35f
(3) 0.65f<r4<0.8f
(4) 1.3<(r5/r4)<1.8
(5) 0.14f<d3+d4+d5<0.18f
(6) 0.13f<d7+d8<0.17f
(7) 1.62<n3<1.7

$$1.7 < \frac{n5 + n6 + n7}{3} < 1.81 \qquad (8)$$

BRIEF DESCRIPTION OF THE DRAWINGS

FIGS. 4A, 4B and 4C respectively show aberration curves of a third embodiment.

FIGS. 5A, 5B and 5C respectively show aberration curves of a fourth embodiment.

DESCRIPTION OF THE PREFERRED EMBODIMENTS

Figure 1:
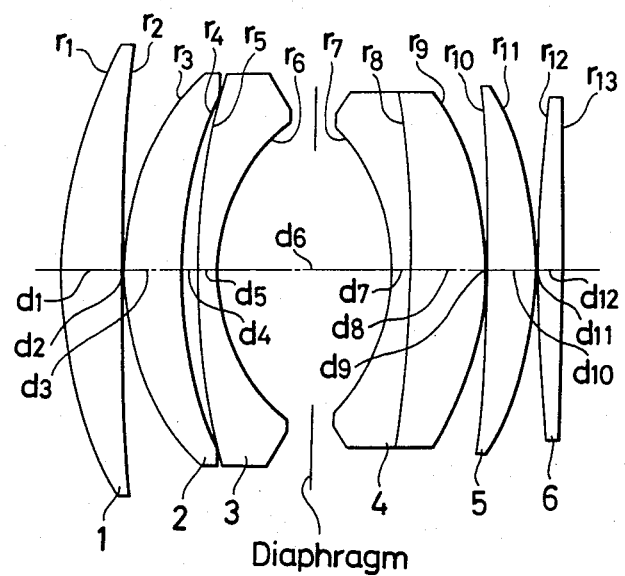
FIG. 1 shows an embodiment of the lens in accordance with the present invention in section.
Figure 2A:
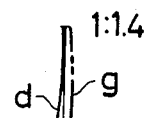
FIGS. 2A, 2B and 2C respectively show aberration curves of the first embodiment.
Figure 2B:
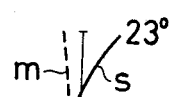
Figure 2C:
Figure 3A:
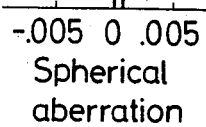
FIGS. 3A, 3B and 3C respectively show aberration curves of a second embodiment.
Figure 3B:
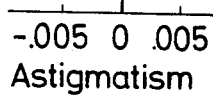
Figure 3C:
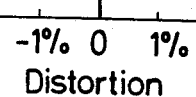
Figure 6A:
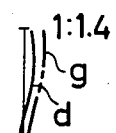
FIGS. 6A, 6B and 6C respectively show aberration curves of a fifth embodiment.
Figure 6B:
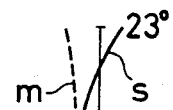
Figure 6C:
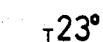
Figure 7A:
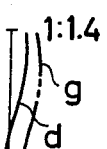
FIGS. 7A, 7B and 7C respectively show aberration curves of a sixth embodiment.
Figure 7B:
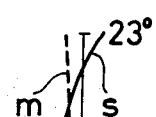
Figure 7C:
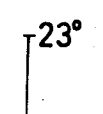

Below the measuring of each condition will be explained.

In the case of a lens of Gauss type, the balance of each aberration is properly compensated by means of the strongly concave surface at both sides of the diaphragm, whereby by means of the effect of the surfaces the coma in the middle of the image field (or zonal image area) and the halo of the marginal image area, namely the sagital halo is very large, which is inconvenient. This shortcoming can be eliminated by decreasing the radius of curvature of both of the surfaces, whereby on the other hand the spherical aberration, the astigmatism and the Petzval sum, which contribute for most of the compensation become worse. The conditions (1) and (2) are essential for the proper compensation of the above mentioned aberrations together with those (3) and (4). Namely, beyond the lower limits of the conditions (1) and (2) the coma and the sagital halo become remarkable, while beyond the upper limits, the short compensation of the spherical aberration and the increase of the Petzval sum take place in such a manner that the lens is not suited as the lens with a large aperture such as of F1.4. The condition (3) is essential for decreasing the sagital halo under the circumstances stipulated by the conditions (1) and (2), whereby beyond the lower limit the refractive power of the halo passing through the marginal height on the planes is weakened so as to increase the halo. On the other hand, beyond the upper limit, the astigmatism becomes large under the condition (1), which is also inconvenient. The condition (4) is essential for the proper compensation of the basic aberration within the range of r4 stipulated by the condition (3). Namely, if r6 and r7 are set within the range of the conditions (1) and (2), the off-axial sagital halo is better compensated, while the short compensation of the spherical aberration and the astigmatism takes place so as to increase the Petzval sum. In consequence, the divergent effect is motivated with the air gap between the second and the third lens so as to compensated the above. Namely, by choosing the ratio of r5 to r4 larger than 1 (r5/r4>1), a negative lens is formed with the air gap. Further, in this way, the divergent part is placed in front of the lens in such a manner that the back focal distance is enlarged, which is convenient, while if the above mentioned ratio is chosen too large, the divergence of the halo passing through the higher part of the pupil becomes large, whereby the coma is apt to take place. Beyond the lower limit of the condition (4), it becomes difficult to compensate the above mentioned aberration, while beyond the upper limit the coma becomes remarkable. The condition (5) is essential for keeping the compactness and the long back focal distance, whereby beyond the lower limit it is advantageous for the compactness, while the spherical aberration is too large and the astigmatism is under corrected. On the other hand, beyond the upper limit the back focal distance becomes short. The condition (6) is essential for properly keeping the residual spherical aberration and the astigmatism when the conditions (1)-(5) are set, whereby beyond the lower limit the spherical aberration is over corrected and the astigmatism is under corrected, while beyond the upper limit the total length becomes large, which is inconvenient for realizing the compactness. The condition (7) represents the most suitable range of the refractive index of the third lens in case r6 is set within the range of the condition (1), whereby beyond the lower limit divergent power becomes short so that it becomes necessary to decrease r6 further and the halo is increased. Beyond the upper limit the Petzval sum is increased. The condition (8) is essential to keep the amount of each aberration small, by constituting the positive lenses in the fourth, the fifth and the sixth lens groups whose refractive power is strengthened in order to obtain a long back focal distance with glass with high refractive index, whereby beyond the lower limit it becomes necessary to give large radius of curvature to each surface in such a manner that the spherical aberration becomes under corrected while the Petzval sum becomes large, which is disadvantageous for a lens with large aperture. The upper limit represents the limit of the easily obtainable glass material, whereby if a glass with higher refractive index becomes easily obtainable in future, the higher refractive index than the upper limit at present will be more advantageous.

Below the numerical data of the embodiment in accordance with the present invention will be given. Hereby FIGS. 2 to 7 respectively show the spherical aberration, the astigmatism and the distorsion of the embodiments 1-6 with reference to the object at the infinite distance.

Embodiment 1:
f = 1   FNo. 1:1.4   Picture angle 46°   Back focus = 0.70868
  r1 =    0.75007    d1 = 0.09986    n1 = 1.77250   v1 = 49.60
  r2 =    4.20556    d2 = 0.00293
  r3 =    0.46290    d3 = 0.09542    n2 = 1.69350   v2 = 53.20
  r4 =    0.71861    d4 = 0.02597
  r5 =    1.21854    d5 = 0.03392    n3 = 1.64769   v3 = 33.80
  r6 =    0.31102    d6 = 0.28315
  r7 =   −0.33415    d7 = 0.03103    n4 = 1.75520   v4 = 27.50
  r8 =   −2.06167    d8 = 0.12413    n5 = 1.77250   v5 = 49.60
  r9 =   −0.53708    d9 = 0.00334
  r10 =  −3.37100    d10 = 0.07844   n6 = 1.77250   v6 = 49.60
  r11 =  −0.61324    d11 = 0.00389
  r12 =   2.29693    d12 = 0.04060   n7 = 1.69350   v7 = 53.20
  r13 = −10.31163
Total length = 0.82268
Entrance pupil = 0.48205 (with reference to the first plane)

Embodiment 2:
f = 1   FNo. 1:1.4   Picture angle 46°   Back focus = 0.70258
  r1 =    0.75437    d1 = 0.10070    n1 = 1.77250   v1 = 49.60
  r2 =    4.31973    d2 = 0.00304
  r3 =    0.46219    d3 = 0.09318    n2 = 1.69680   v2 = 55.50
  r4 =    0.70497    d4 = 0.03340
  r5 =    1.21525    d5 = 0.02757    n3 = 1.64769   v3 = 33.80
  r6 =    0.31404    d6 = 0.28968
  r7 =   −0.33807    d7 = 0.02715    n4 = 1.75520   v4 = 27.50
  r8 =   −2.35029    d8 = 0.11973    n5 = 1.77250   v5 = 49.60
  r9 =   −0.53811    d9 = 0.00941
  r10 =  −3.49558    d10 = 0.08327   n6 = 1.77250   v6 = 49.60
  r11 =  −0.61732    d11 = 0.00290
  r12 =   2.44248    d12 = 0.03870   n7 = 1.77250   v7 = 49.60
  r13 = −12.46751
Total length = 0.82874     Entrance pupil = 0.50245

Embodiment 3:
f = 1   FNo. 1:1.4   Picture angle = 46°   Back focus = 0.70388
  r1 =    0.68741    d1 = 0.11050    n1 = 1.77250   v1 = 49.60
  r2 =    3.07017    d2 = 0.00291
  r3 =    0.47148    d3 = 0.08740    n2 = 1.69350   v2 = 53.20
  r4 =    0.73058    d4 = 0.02162
  r5 =    1.11263    d5 = 0.03488    n3 = 1.64769   v3 = 33.80
  r6 =    0.30668    d6 = 0.31211
  r7 =   −0.33272    d7 = 0.03876    n4 = 1.75520   v4 = 27.50
  r8 =   −3.50650    d8 = 0.12365    n5 = 1.77250   v5 = 49.60
  r9 =   −0.57052    d9 = 0.00388
  r10 =  −1.77010    d10 = 0.07741   n6 = 1.77250   v6 = 49.60
  r11 =  −0.57357    d11 = 0.00388
  r12 =   2.25173    d12 = 0.05089   n7 = 1.77250   v7 = 49.60
  r13 =  −3.85449
Total length = 0.86789     Entrance pupil = 0.48802

Embodiment 4:
f = 1   FNo. = 1:1.4   Picture angle 46°   Back focus = 0.70463
  r1 =    0.83165    d1 = 0.10096    n1 = 1.77250   v1 = 49.60
  r2 =    4.40109    d2 = 0.00116
  r3 =    0.46114    d3 = 0.11126    n2 = 1.69350   v2 = 53.20
  r4 =    0.69357    d4 = 0.02751
  r5 =    1.02753    d5 = 0.02965    n3 = 1.64769   v3 = 33.80
  r6 =    0.31040    d6 = 0.31735
  r7 =   −0.32894    d7 = 0.02946    n4 = 1.76182   v4 = 26.60
  r8 =   −1.81462    d8 = 0.11887    n5 = 1.77250   v5 = 49.60
  r9 =   −0.53568    d9 = 0.00159
  r10 =  −2.17795    d10 = 0.09170   n6 = 1.77250   v6 = 49.60
  r11 =  −0.57924    d11 = 0.00080
  r12 =   2.31356    d12 = 0.05540   n7 = 1.77250   v7 = 49.60
  r13 =  −5.10137
Total length = 0.88571     Entrance pupil = 0.51830

Embodiment 5:

-continued

| | | | | | | |
|---|---|---|---|---|---|---|
| f = 1 | FNo. 1:1.4 | Picture angle 46° | Back focus = 0.69729 | | | |
| r1 = 0.67273 | d1 = 0.11077 | n1 = 1.78590 | v1 = 44.20 | | | |
| r2 = 2.54888 | d2 = 0.00250 | | | | | |
| r3 = 0.46780 | d3 = 0.09273 | n2 = 1.69350 | v2 = 53.20 | | | |
| r4 = 0.71105 | d4 = 0.02617 | | | | | |

-continued

Entrance pupil = 0.50343

Below the Seidel's aberration for the object at the infinite distance will be given.

Embodiment 1:

| Picture No. | Spherical aberration | Coma | Astigmatism | Petzval sum | Distortion |
|---|---|---|---|---|---|
| 1 | 0.582672 | 0.156168 | 0.041856 | 0.581048 | 0.166951 |
| 2 | 0.190625 | −0.419133 | 0.880015 | −0.103631 | −1.630100 |
| 3 | −0.086990 | −0.042518 | −0.020781 | 0.884659 | 0.422233 |
| 4 | 0.069164 | −0.266542 | 1.027189 | −0.569861 | −1.762433 |
| 5 | −0.434102 | 0.795176 | −1.456584/ 0.322592 | 2.077220 | |
| 6 | −0.981767 | −0.406065 | 0.167951 | −1.263891 | −0.592220 |
| 7 | −2.272425 | 0.817343 | −0.293981 | −1.287633 | 0.568873 |
| 8 | 0.000849 | 0.002876 | 0.009747 | −0.002697 | 0.023895 |
| 9 | 0.398957 | −0.202210 | 0.102490 | 0.811477 | −0.463242 |
| 10 | −0.000881 | 0.005982 | −0.040603 | −0.129287 | 1.153071 |
| 11 | 2.167143 | −0.178978 | 0.014781 | 0.710690 | −0.059915 |
| 12 | −0.049836 | 0.133531 | −0.357785 | 0.178285 | 0.480953 |
| 13 | 0.540654 | −0.347909 | 0.223878 | 0.039713 | −0.169620 |
| Total | 0.133063 | 0.047720 | −0.087729 | 0.171463 | 0.215668 |
| 1 | 0.809352 | 0.125547 | 0.019475 | 0.654141 | 0.104491 |
| 2 | 0.128580 | −0.325397 | 0.823479 | −0.172648 | −1.647052 |
| 3 | −0.107006 | −0.057606 | −0.031012 | 0.875394 | 0.454568 |
| 4 | 0.065142 | −0.260422 | 1.041114 | −0.575917 | −1.859761 |
| 5 | −0.267671 | 0.603438 | −1.360388 | 0.416578 | 2.127723 |
| 6 | −1.050488 | −0.389152 | −0.144161 | −1.339392 | −0.549581 |
| 7 | −2.226954 | 0.700051 | −0.220063 | −1.372655 | 0.500677 |
| 8 | 0.000687 | 0.000998 | 0.001451 | 0.000115 | 0.002275 |
| 9 | 0.190243 | −0.126929 | 0.084686 | 0.791920 | −0.584866 |
| 10 | −0.000707 | 0.003052 | −0.013174 | −0.264865 | 1.200187 |
| 11 | 1.817634 | −0.018727 | 0.000193 | 0.793112 | −0.008174 |
| 12 | −0.16440 | 0.073307 | −0.326891 | 0.189398 | 0.613102 |
| 13 | 0.777223 | −0.291510 | 0.109336 | 0.141287 | −0.094000 |
| Total | 0.119595 | 0.036649 | −0.015956 | 0.136469 | 0.259589 |

| | | Ex. 1 | Ex. 2 | Ex. 3 | Ex. 4 | Ex. 5 | Ex. 6 |
|---|---|---|---|---|---|---|---|
| 1 | r6 | 0.311f | 0.314f | 0.307f | 0.310f | 0.300f | 0.304f |
| 2 | \|r7\| | 0.334f | 0.338f | 0.333f | 0.329f | 0.325f | 0.313f |
| 3 | r4 | 0.719f | 0.705f | 0.731f | 0.694f | 0.711f | 0.739f |
| 4 | $\frac{r5}{r4}$ | 1.696 | 1.724 | 1.523 | 1.482 | 1.358 | 1.533 |
| 5 | d3 + d4 + d5 | 0.155f | 0.154f | 0.144f | 0.168f | 0.149f | 0.157f |
| 6 | d7 + d8 | 0.155f | 0.147f | 0.162f | 0.148f | 0.149f | 0.139f |
| 7 | n3 | 1.64769 | 1.64769 | 1.64769 | 1.64769 | 1.67270 | 1.63980 |
| 8 | $\frac{n5 + n6 + n7}{3}$ | 1.74617 | 1.7725 | 1.7725 | 1.7725 | 1.8061 | 1.7725 |

| | | | |
|---|---|---|---|
| r5 = 0.96540 | d5 = 0.02965 | n3 = 1.67270 | v3 = 32.10 |
| r6 = 0.30026 | d6 = 0.31698 | | |
| r7 = −0.32495 | d7 = 0.02946 | n4 = 1.80518 | v4 = 25.40 |
| r8 = 2.45538 | d8 = 0.11911 | n5 = 1.80610 | v5 = 40.90 |
| r9 = −0.56359 | d9 = 0.01209 | | |
| r10 = −1.68509 | d10 = 0.08782 | n6 = 1.80610 | v6 = 40.90 |
| r11 = −0.56275 | d11 = 0.00187 | | |
| r12 = 2.35652 | d12 = 0.06410 | n7 = 1.80610 | v7 = 40.90 |
| r13 = −3.15896 | | | |
| Total length = 0.89325 | Entrance pupil = 0.51761 | | |

Embodiment 6:

| | | | |
|---|---|---|---|
| f = 1 | FNo. 1:1.4 | Picture angle 46° | Back focus = 0.70815 |
| r1 = 0.71382 | d1 = 0.11021 | n1 = 1.77250 | v1 = 49.60 |
| r2 = 3.17163 | d2 = 0.00186 | | |
| r3 = 0.47532 | d3 = 0.07913 | n2 = 1.69350 | v2 = 53.20 |
| r4 = 0.73881 | d4 = 0.02172 | | |
| r5 = 1.13281 | d5 = 0.05571 | n3 = 1.63980 | v3 = 34.50 |
| r6 = 0.30363 | d6 = 0.31103 | | |
| r7 = −0.31306 | d7 = 0.02546 | n4 = 1.75520 | v4 = 27.50 |
| r8 = −2.45071 | d8 = 0.11342 | n5 = 1.77250 | v5 = 49.60 |
| r9 = −0.50322 | d9 = 0.00403 | | |
| r10 = −1.91013 | d10 = 0.09047 | n6 = 1.77250 | v6 = 49.60 |
| r11 = −0.55847 | d11 = 0.00291 | | |
| r12 = 2.67471 | d12 = 0.05304 | n7 = 1.77250 | v7 = 49.60 |
| r13 = −4.23175 | | | |
| Total length = 0.86898 | | | |

As shown in FIG. 1, an aspect of the present invention is that the second positive meniscus lens has edge contact with the third negative meniscus lens.

What is claimed is:

1. A compact photographic lens with large aperture comprising: a first positive meniscus lens whose convex surface is directed to the object, a second positive meniscus lens whose convex surface is directed to the object, a third negative meniscus lens whose convex surface is directed to the object, a fourth negative meniscus lens consisting of a negative and a positive lens cemented on each other, and having a concave surface directed to the object, a fifth positive meniscus lens whose concave surface is directed to the object and a sixth lens and satisfying the conditions:

(1) $0.29f < r6 < 0.33f$
(2) $0.30f < |r7| < 0.35f$
(3) $0.65f < r4 < 0.8f$
(4) $1.3 < (r5/r4) < 1.8$
(5) $0.14f < d3+d4+d5 < 0.18f$
(6) $0.13f < d7+d8 < 0.17f$ and wherein $1.62 < n3 < 1.7$ whereby f is the focal length of the photographic lens, ri the radius of curvature of the i-th lens surface, di the i-th distance between the lens vertexes and ni is the refractive index of the i-th lens.

2. A compact photographic lens with large aperture in accordance with claim 1, in which said second positive meniscus lens has edge-contact with said third negative meniscus lens.

3. A compact photographic lens with large aperture comprising: a first positive meniscus lens whose convex surface is directed to the object, a second positive meniscus lens whose convex surface is directed to the object, a third negative meniscus lens whose convex surface is directed to the object, a fourth negative meniscus lens consisting of a negative and a positive lens cemented on each other, and having a concave surface directed to the object, a fifth positive meniscus lens whose concave surface is directed to the object and a sixth lens and satisfying the conditions:

(1) $0.29f < r6 < 0.33f$
(2) $0.30f < |r7| < 0.35f$
(3) $0.65f < r4 < 0.8f$
(4) $1.3 < (r5/r4) < 1.8$
(5) $0.14f < d3+d4+d5 < 0.18f$
(6) $0.13f < d7+d8 < 0.17f$ whereby f is the focal length of the photographic lens, ri the radius of curvature of the i-th lens surface and di the i-th distance between the lens vertexes, wherein:

| $f = 1$ | FNo. 1:1.4 | Picture angle 46° | Back focus = 0.70868 | | |
|---|---|---|---|---|---|
| r1 = | 0.75007 | d1 = 0.09986 | n1 = 1.77250 | v1 = 49.60 |
| r2 = | 4.20556 | d2 = 0.00293 | | |
| r3 = | 0.46290 | d3 = 0.09542 | n2 = 1.69350 | v2 = 53.20 |
| r4 = | 0.71861 | d4 = 0.02597 | | |
| r5 = | 1.21854 | d5 = 0.03392 | n3 = 1.64769 | v3 = 33.80 |
| r6 = | 0.31102 | d6 = 0.28315 | | |
| r7 = | −0.33415 | d7 = 0.03103 | n4 = 1.75520 | v4 = 27.50 |
| r8 = | −2.06167 | d8 = 0.12413 | n5 = 1.72250 | v5 = 49.60 |
| r9 = | −0.53708 | d9 = 0.00334 | | |
| r10 = | −3.37100 | d10 = 0.07844 | n6 = 1.77250 | v6 = 49.60 |
| r11 = | −0.61324 | d11 = 0.00389 | | |
| r12 = | 2.29693 | d12 = 0.04060 | n7 = 1.69350 | v7 = 53.20 |
| r13 = | −10.31163 | | | |

Total length = 0.82268
Entrance pupil = 0.48205 (with reference to the first plane and wherein
ri: the radius of curvature
di: the lens thickness or air space
ni: the refractive index of lens material
vi: the Abbe number of lens material.

4. A compact photographic lens with large aperture comprising: a first positive meniscus lens whose convex surface is directed to the object, a second positive meniscus lens whose convex surface is directed to the object, a third negative meniscus lens whose convex surface is directed to the object, a fourth negative meniscus lens consisting of a negative and a positive lens cemented on each other, and having a concave surface directed to the object, a fifth positive meniscus lens whose concave surface is directed to the object and a sixth lens and satisfying the conditions:

(1) $0.29f < r6 < 0.33f$
(2) $0.30f < |r7| < 0.35f$
(3) $0.65f < r4 < 0.8f$
(4) $1.3 < (r5/r4) < 1.8$
(5) $0.14f < d3+d4+d5 < 0.18f$
(6) $0.13f < d7+d8 < 0.17f$ whereby f is the focal length of the photographic lens, ri the radius of curvature of the i-th lens surface and di the i-th distance between the lens vertexes, wherein:

| $f = 1$ | FNo. 1:1.4 | Picture angle 46° | Back focus = 0.70258 | | |
|---|---|---|---|---|---|
| r1 = | 0.75437 | d1 = 0.10070 | n1 = 1.77250 | v1 = 49.60 |
| r2 = | 4.31973 | d2 = 0.00304 | | |
| r3 = | 0.46219 | d3 = 0.09318 | n2 = 1.69680 | v2 = 55.50 |
| r4 = | 0.70497 | d4 = 0.03340 | | |
| r5 = | 1.21525 | d5 = 0.02757 | n3 = 1.64769 | v3 = 33.80 |
| r6 = | 0.31404 | d6 = 0.28968 | | |
| r7 = | −0.33807 | d7 = 0.02715 | n4 = 1.75520 | v4 = 27.50 |
| r8 = | −2.35029 | d8 = 0.11973 | n5 = 1.77250 | v5 = −9.60 |
| r9 = | −0.53811 | d9 = 0.00941 | | |
| r10 = | 31 3.49558 | d10 = 0.08327 | n6 = 1.77250 | v6 = 19.60 |
| r11 = | −0.61732 | d11 = 0.00290 | | |
| r12 = | 2.44248 | d12 = 0.03870 | n7 = 1.77250 | v7 = 49.60 |
| r13 = | −12.46751 | | | |

Total length = 0.82874
Entrance pupil = 0.50245 and wherein
ri: the radius of curvature
di: the lens thickness or air space
ni: the refractive index of lens material
vi: the Abbe number of lens material.

5. A compact photographic lens with large aperture comprising: a first positive meniscus lens whose convex surface is directed to the object, a second positive meniscus lens whose convex surface is directed to the object, a third negative meniscus lens whose convex surface is directed to the object, a fourth negative meniscus lens consisting of a negative and a positive lens cemented on each other, and having a concave surface directed to the object, a fifth positive meniscus lens whose concave surface is directed to the object and a sixth lens and satisfying the conditions:

(1) $0.29f < r6 < 0.33f$
(2) $0.30f < |r7| < 0.35f$
(3) $0.65f < r4 < 0.8f$
(4) $1.3 < (r5/r4) < 1.8$
(5) $0.14f < d3+d4+d5 < 0.18f$
(6) $0.13f < d7+d8 < 0.17f$ whereby f is the focal length of the photographic lens, ri the radius of curvature of the i-th lens surface and di the i-th distance between the lens vertexes, wherein:

| $f = 1$ | FNo. 1:1.4 | Picture angle = 46° | Back focus = 0.73333 | | |
|---|---|---|---|---|---|
| r1 = | 0.68741 | d1 = 0.11050 | n1 = 1.77250 | v1 = 49.60 |
| r2 = | 3.0707 | d2 = 0.00291 | | |
| r3 = | 0.47148 | d3 = 0.08740 | n2 = 1.69350 | v2 = 53.20 |
| r4 = | 0.73056 | d4 = 0.02162 | | |
| r5 = | 1.11263 | d5 = 0.03488 | n3 = 1.64769 | v3 = 33.80 |
| r6 = | 0.30668 | d6 = 0.31211 | | |
| r7 = | −0.33272 | d7 = 0.03876 | n4 = 1.75520 | v4 = 27.50 |
| r8 = | −3.50650 | d8 = 0.12365 | n5 = 1.77250 | v5 = 49.60 |
| r9 = 31 | 0.57052 | d9 = 0.00388 | | |
| r10 = | −1.7700 | d10 = 0.07741 | 6 = 1.77250 | v6 = 49.60 |
| r11 = 31 0.57357 | d11 = 0.00388 | | | |
| r12 = | 2.25173 | d12 = 0.05089 | n7 = 1.77250 | v7 = 49.60 |
| r13 = | −3.85449 | | | |

Total length = 0.86789    Entrance pupil = 0.48802 and wherein
ri: the radius of curvature
di: the lens thickness or air space
ni: the refractive index of lens material
vi: the Abbe number of lens material.

6. A compact photographic lens with large aperture comprising: a first positive meniscus lens whose convex surface is directed to the object, a second positive meniscus lens whose convex surface is directed to the object, a third negative meniscus lens whose convex surface is directed to the object, a fourth negative meniscus lens consisting of a negative and a positive lens cemented on each other, and having a concave surface directed to the object, a fifth positive meniscus lens whose concave surface is directed to the object and a sixth lens and satisfying the conditions:

(1) $0.29f < r6 < 0.33f$
(2) $0.30f < |r7| < 0.35f$
(3) $0.65f < r4 < 0.8f$
(4) $1.3 < (r5/r4) < 1.8$
(5) $0.14f < d3+d4+d5 < 0.18f$
(6) $0.13f < d7+d8 < 0.17f$ whereby f is the focal length of the photographic lens, ri the radius of curvature of the i-th lens surface and di the i-th distance between the lens vertexes, wherein:

| f = 1 | FNo. = 1:1.4 | Picture angle 46° | Back focus = 0.70463 | |
|---|---|---|---|---|
| r1 = 0.83165 | d1 = 0.10096 | n1 = 1.77250 | v1 = 49.60 | |
| r2 = 4.40109 | d2 = 0.00116 | | | |
| r3 = 0.46114 | d3 = 0.11126 | n2 = 1.69350 | v2 = 53.20 | |
| r4 = 0.69357 | d4 = 0.02751 | | | |
| r5 = 1.02753 | d5 = 0.02965 | n3 = 1.64769 | v3 = 33.80 | |
| r6 = 0.31040 | d6 = 0.31735 | | | |
| r7 = −0.32894 | d7 = 0.02946 | n4 = 1.76182 | v4 = 26.60 | |
| r8 = −1.81462 | d8 = 0.11887 | n5 = 1.77250 | v5 = 49.60 | |
| r9 = −0.53568 | d9 = 0.00159 | | | |
| r10 = −2.17795 | d10 = 0.09170 | n6 = 1.77250 | v6 = 49.60 | |
| r11 = −0.57924 | d11 = 0.00080 | | | |
| r12 = 2.31356 | d12 = 0.05540 | n7 = 1.77250 | v7 = 49.60 | |
| r13 = −5.10137 | | | | |
| Total length = 0.88571 | Entrance pupil = 0.51830 | | | | and wherein
ri: the radius of curvature
di: the lens thickness or air space
ni: the refractive index of lens material
vi: the Abbe number of lens material.

7. A compact photographic lens with large aperture comprising: a first positive meniscus lens whose convex surface is directed to the object, a second positive meniscus lens whose convex surface is directed to the object, a third negative meniscus lens whose convex surface is directed to the object, a fourth negative meniscus lens consisting of a netative and a positive lens cemented on each other, and having a concave surface directed to the object, a fifth positive meniscus lens whose concave surface is directed to the object and a sixth lens and satisfying the conditions:

(1) $0.29f < r6 < 0.33f$
(2) $0.30f < |r7| < 0.35f$
(3) $0.65f < r4 < 0.8f$
(4) $1.3 < (r5/r4) < 1.8$
(5) $0.14f < d3+d4+d5 < 0.18f$
(6) $0.13f < d7+d8 < 0.17f$ whereby f is the focal length of the photographic lens, ri the radius of curvature of the i-th lens surface and di the i-th distance between the lens vertexes, wherein:

| f = 1 | FNo. 1:1.4 | Picture angle 46° | Back focus = 0.69729 | |
|---|---|---|---|---|
| r1 = 0.67273 | d1 = 0.11077 | n1 = 1.78590 | v1 = 44.20 | |
| r2 = 2.54888 | d2 = 0.00250 | | | |
| r3 = 0.46780 | d3 = 0.09273 | n2 = 1.69350 | v2 = 53.20 | |
| r4 = 0.71105 | d4 = 0.02617 | | | |
| r5 = 0.96540 | d5 = 0.02965 | n3 = 1.67270 | v3 = 32.10 | |
| r6 = 0.30026 | d6 = 0.31698 | | | |
| r7 = −0.32495 | d7 = 0.02946 | n4 = 1.80518 | v4 = 25.40 | |
| r8 = 2.45538 | d8 = 0.11911 | n5 = 1.80610 | v5 = 40.90 | |
| r9 = −0.56359 | d9 = 0.01209 | | | |
| r10 = −1.68509 | d10 = 0.08732 | n6 = 1.80610 | v6 = 4.90 | |
| r11 = −0.56275 | d11 = 0.00187 | | | |
| r12 = 2.35652 | d12 = 0.06410 | n7 = 1.80610 | v7 = 40.90 | |
| r13 = −3.15896 | | | | |
| Total length = 0.89325 | Entrance pupil = 0.51761 | | | | and wherein
ri: the radius of curvature
di: the lens thickness or air space
ni: the refractive index of lens material
vi: the Abbe number of lens material.

8. A compact photographic lens with large aperture comprising: a first positive meniscus lens whose convex surface is directed to the object, a second positive meniscus lens whose convex surface is directed to the object, a third negative meniscus lens whose convex surface is directed to the object, a fourth negative meniscus lens consisting of a negative and a positive lens cemented on each other, and having a concave surface directed to the object, a fifth positive meniscus lens whose concave surface is directed to the object and a sixth lens and satisfying the conditions:

(1) $0.29f < r6 < 0.33f$
(2) $0.30f < |r7| < 0.35f$
(3) $0.65f < r4 < 0.8f$
(4) $1.3 < (r5/r4) < 1.8$
(5) $0.14f < d3+d4+d5 < 0.18f$
(6) $0.13f < d7+d8 < 0.17f$ whereby f is the focal length of the photographic lens, ri the radius of curvature of the i-th lens surface and di the i-th distance between the lens vertexes, wherein:

| f = 1 | FNo. 1:1.4 | Picture angle 46° | Back focus = 0.70815 | |
|---|---|---|---|---|
| r1 = 0.71382 | d1 = 0.11021 | n1 = 1.77250 | v1 = 19.60 | |
| r2 = 3.17163 | d2 = 0.00186 | | | |
| r3 = 0.47532 | d3 = 0.07913 | n2 = 1.69350 | v2 = 53.20 | |
| r4 = 0.73881 | d4 = 0.02172 | | | |
| r5 = 1.13281 | dt = 0.05571 | n3 = 1.63980 | v3 = 34.50 | |
| r6 = 0.30363 | d6 = 0.31103 | | | |
| r7 = −0.31306 | d7 = 0.02546 | n4 = 1.75520 | v4 = 27.50 | |
| r8 = −2.45071 | d8 = 0.11342 | n5 = 1.77250 | v5 = 49.60 | |
| r9 = −0.50322 | d9 = 0.00403 | | | |
| r10 = −1.91013 | d10 = 0.09047 | n6 = 1.77250 | v6 = 49.60 | |
| r11 = −0.55847 | d11 = 0.00291 | | | |
| r12 = 2.67471 | d12 = 0.05304 | n7 = 1.77250 | v7 = 49.60 | |
| r13 = −4.23175 | | | | |
| Total length = 0.86898 | | | | |
| Entrance pupil = 0.50343 | | | | | and wherein
ri: the radius of curvature
di: the lens thickness of air space
ni: the refractive index of lens material
vi: the Abbe number of lens material.

* * * * *